Nov. 12, 1946.  W. B. McLEAN  2,410,832
SNAP-ON-PROPELLER
Filed April 19, 1944
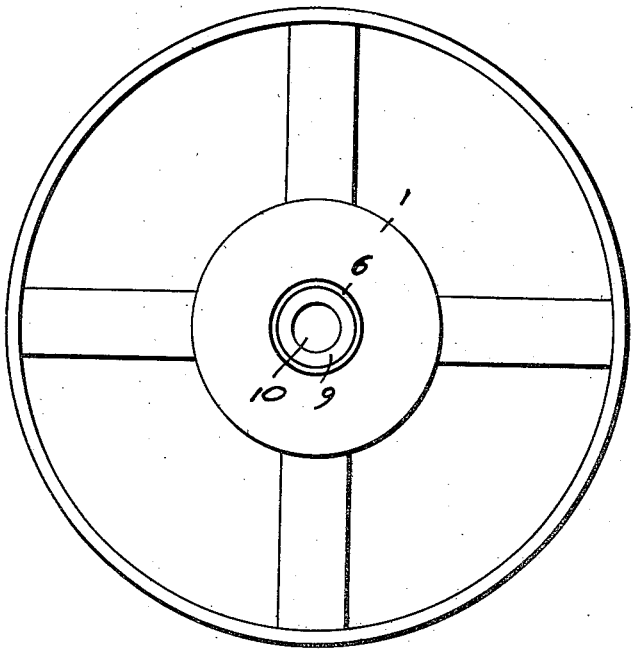
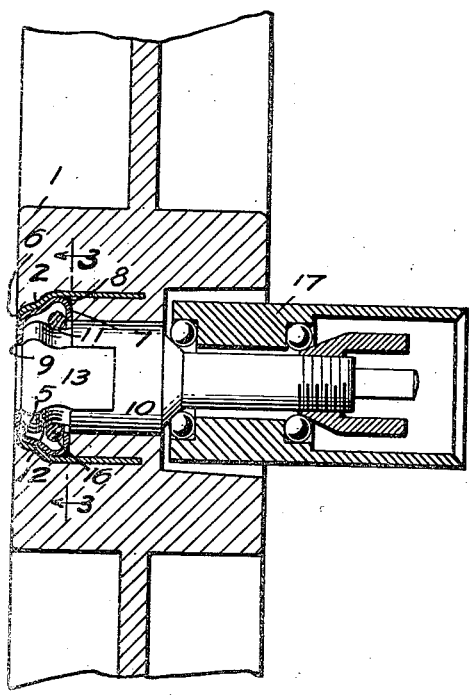
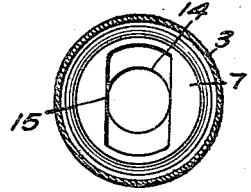
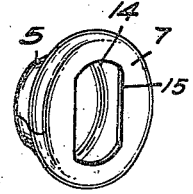
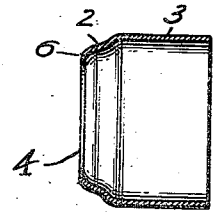
INVENTOR
WILLIAM B. McLEAN
BY William D. Hall
ATTORNEY Patented Nov. 12, 1946

2,410,832

UNITED STATES PATENT OFFICE 2,410,832

SNAP-ON PROPELLER

William B. McLean, Washington, D. C., assignor to the Government of the United States of America, as represented by the Secretary of War Application April 19, 1944, Serial No. 531,842

5 Claims. (Cl. 287—53)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to couplings, and more particularly to improvements in devices for detachably mounting collars and the like on the ends of shafts.

Heretofore, collars, which term generically includes the hubs of pulleys, propellers, wheels and the like, have been attached to the ends of shafts by means of keys, threaded locking rings, and other expedients which require an appreciable time for attaching or detaching the collar. In certain apparatus used for military purposes, the time consumed in assembling the apparatus is of great importance, and the well known expedients mentioned above have been found unsatisfactory.

It is, therefore, an object of this invention to provide a coupling device for quickly mounting a collar or the like detachably on the end of a shaft.

A further object is the provision of a coupling device, forming a part of a collar, which can be quickly snapped on or off of a shaft by a single movement.

These and other objects are attained by the novel structure and arrangement hereinafter described, and illustrated in the accompanying drawing, forming a part hereof, and in which:

Fig. 1 is a sectional view of a collar and coupling device embodying the invention.

Fig. 2 is a front view of the collar and coupling device.

Fig. 3 is a sectional view taken on line 3—3 of Fig. 1.

Fig. 4 is a perspective view of a cap forming a part of the coupling device.

Fig. 5 is a sectional view of a shell used in the device.

Referring to the drawing, in Fig. 1 is shown a collar or hub 1 of a pulley, propeller, wheel or similar device, preferably made of a plastic material such as Bakelite. A tubular shell 2 has a flange 3 moulded in the collar 1. The shell has an opening at 4, and fits over a cap 5, and the edge 6 of the shell bordering the opening 4 is swaged over the cap 5 to tightly hold the cap in place. The cap 5 has a rear wall 7 abutting a shoulder 8 on the collar, and a front wall 9 adapted to abut the end of a shaft 10, which is journalled in a ball bearing device 17.

The shaft 10 has adjacent its end a peripheral groove 11, and the portion of the shaft between the groove and its end is rounded as shown at 12. Diametrically opposite sides of the shaft 10 are flat as shown at 13, and the rear wall 7 of cap 5 has an aperture 14 with straight sides 15 engaging the flat sides 13 to prevent rotary movement of the cap on the shaft.

Positioned in the cap 5 is a split expansible ring 16 having a normal internal diameter less than the diameter of the rounded portion 12 of the shaft, and an external diameter greater than the diameter of the opening 14 of cap 5.

It will be seen that the cap 5 is firmly held in place on the collar 1 by the shoulder 8 of the collar and the swaged edge 6 of shell 2. Since the external diameter of ring 16 is greater than the diameter of the opening in cap 5, the ring will not fall out when the collar is removed from the shaft.

In operation, to attach the collar to the shaft, it is only necessary to force the ring 16 over the rounded portion 12 into the groove 11, the straight edges of opening 14 engaging the flat sides 13 of the shaft to cause the collar and shaft to rotate together. To remove the collar, it is only necessary to pull outwardly on the collar to force the split ring over the rounded portion 12 of the shaft.

From the above description it will be seen that there has been provided a simple and effective device for rapidly coupling a collar to a shaft. A single movement only is required to attach or detach the collar, and there are no parts to become disarranged or get out of order. The device can be manufactured at a low cost by stamping the elements from sheet metal, molding the shell and cap into a collar. Obviously, the device can be applied to the hubs of propellers, pulleys, wheels, gears, and other rotating elements.

The above description is to be considered as descriptive and not limitative of the invention, of which modifications can be made without departing from the scope of the invention as set forth in the appended claims.

The invention having been described, what is claimed is:

1. In combination with a shaft having a rounded end and a peripheral groove adjacent the end, a coupling device comprising a collar, a shell having a flange molded in the collar, a cap having a rear wall engaging a shoulder on the collar, and a front wall engaging the end of the shaft, said shell having an edge swaged over the front wall of the cap, and a split expansible ring in the cap, said ring being adapted to pass over the rounded end of the shaft and snap into the groove.

2. In combination with a shaft having a rounded end and a peripheral groove adjacent the end, a coupling device comprising a collar, a shell having a portion molded in the collar, a cap encircling the shaft, said shell engaging the cap to hold the cap firmly in position, a split expansible ring in the cap adapted to pass over the rounded end of the shaft and snap in the groove, and means to prevent rotation of the cap on the shaft.

3. In combination with a shaft having a rounded end and a peripheral groove adjacent the end, a collar, a cap encircling said shaft, means to hold the cap firmly in the collar, an expansible ring in the cap adapted to pass over the rounded end of the shaft and snap in the groove, and means to prevent rotation of the cap on the shaft.

4. In a coupling device, a shaft having a rounded end and a groove adjacent said end, a collar, a cap having a central opening receiving said shaft, means to hold the cap firmly in the collar, means to prevent rotation of the collar on the shaft, and means in the cap cooperating with said rounded end and groove to hold the collar from moving longitudinally on the shaft when the shaft is rotating.

5. In combination with a shaft having a peripheral groove adjacent one end thereof, a collar, a cap encircling the shaft, means to hold the cap firmly in the collar, an expansible ring in the cap adapted to snap in the groove, and means to prevent rotation of the cap on the shaft.

WILLIAM B. McLEAN.